April 7, 1931.  A. DAVIS, JR  1,799,288
INTERLOCK FOR TRUCK TANKS
Filed June 3, 1930  2 Sheets-Sheet 1

INVENTOR
Augustus Davis, Jr.
BY
ATTORNEY

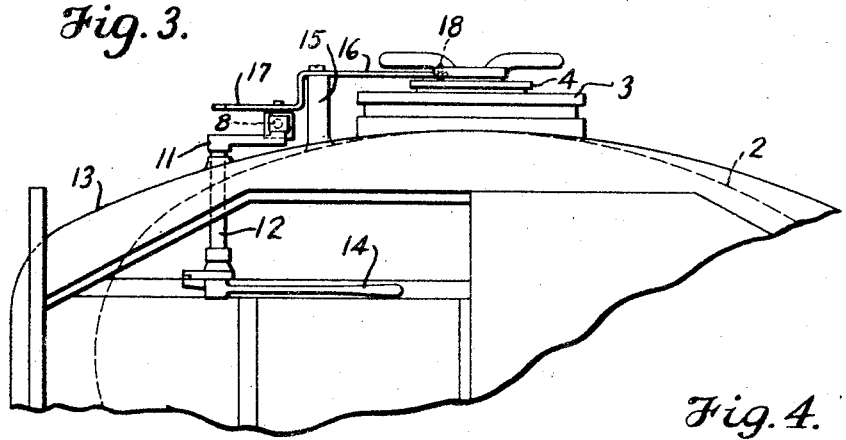
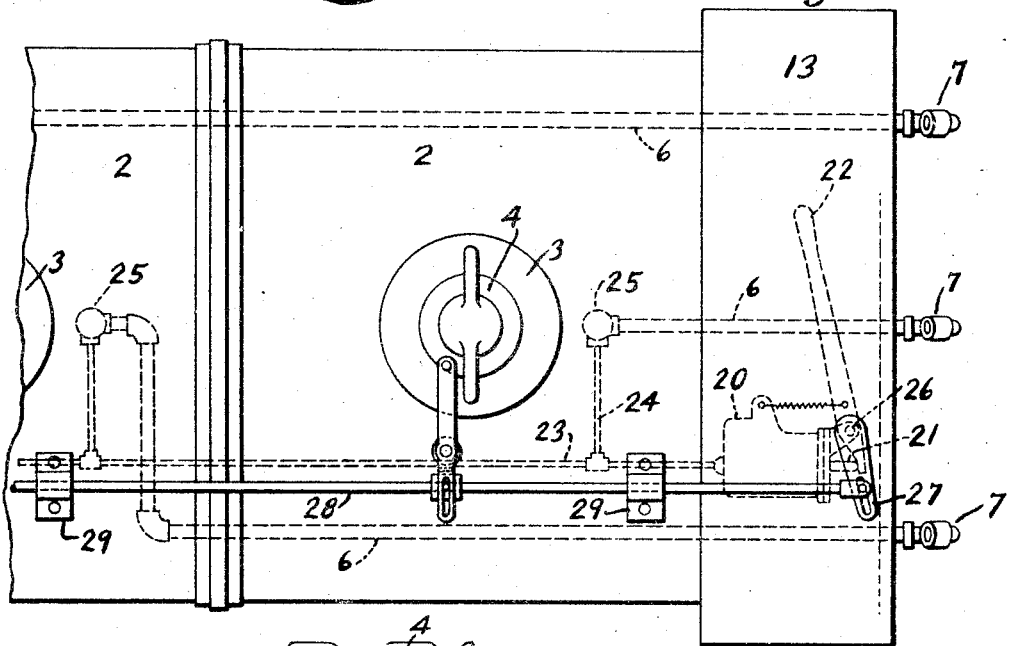
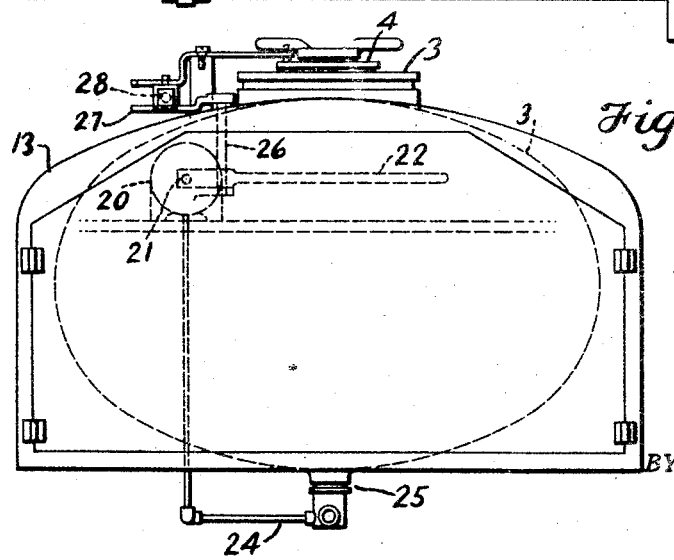

Patented Apr. 7, 1931

1,799,288

UNITED STATES PATENT OFFICE

AUGUSTINE DAVIS, JR., OF CINCINNATI, OHIO

INTERLOCK FOR TRUCK TANKS

Application filed June 3, 1930. Serial No. 459,089.

The compartments of truck tanks such as are used for delivering gasoline are filled to a definite capacity representing the measure which the customer is to receive. The relation of the level of the liquid to this predetermined capacity is shown by an indicator which can be seen when the manhole cover or the fill-opening cover at the top of the compartment is opened.

The liquid is delivered from each compartment of the tank through a pipe which terminates in a faucet or which is otherwise valved near its delivery end, and a normally closed valve, commonly called an emergency valve, is placed for safety between the tank chamber and the delivery pipe. The capacity of the delivery pipe up to the faucet valve may be included in the calibrated capacity of the tank chamber, in which event the compartment should be filled with the emergency valve open. When the emergency valve is then closed, the amount of liquid in the pipe between the valves is cut off from the tank chamber. A dishonest driver can draw off this amount of liquid, and the theft will not be discovered by the customer when the top cover is opened so that he can compare the level of the liquid with the indicator. In a tank having numerous compartments of relatively small capacity the amount of liquid that can be fraudulently removed from the piping is substantial, and the proportion of loss per compartment is of moment.

If the tank chamber is calibrated so as not to include the capacity of the pipe in the measured quantity to be delivered, the chamber would ordinarily be filled with the emergency valve closed, but a dishonest employe can fill with the valve open, and later on empty the pipe, the loss in that case falling on the distributing company instead of on the customer.

The object of this invention is to guard against this form of fraud. This is accomplished by providing an interlock between the emergency valve mechanism and the cover for the inspection opening in the top of the tank, whether this cover be a manhole cover or a fill-opening cover or whether it includes both. The interlock requires that the emergency valve be opened in order that the cover may be opened. Consequently, if the delivery pipe has been emptied, the opening of the emergency valve will permit liquid in the tank chamber to enter the pipe and fill it up to the faucet or other remote delivery valve, and this will cause the level in the tank to fall correspondingly so that the indicator will show to the customer less than the proper quantity in the chamber.

This invention makes it necessary that the chamber be filled with the emergency valve open, so that the delivery pipe will be full, and accordingly the capacity indicator should always be set so as to make allowance for the quantity in the pipe.

In the accompanying drawings forming part hereof:

Fig. 1 is a plan view of a three-compartment truck tank having a mechanically operated emergency valve mechanism, showing an embodiment of the interlock applied thereto at each of the top covers. A portion of the top of a box at the rear end of the tank is broken out to show the operating lever. The valve mechanism and the interlocks are shown in full lines in the position in which the emergency valves are closed and the covers can not be opened. The view also shows in broken lines the positions to which the parts are moved to open the valves and to free the covers so that they can be opened.

Fig. 3 is a fragmentary rear elevation.

Fig. 4 is a plan view of a part of a tank showing the application of the invention to a hydraulic emergency valve mechanism.

Fig. 5 is a rear elevation of the same.

It is to be understood that the two forms shown in these views are primarily illustrative, representing the present preferred modes of applying the interlock in combination with two general types of valve control, and that numerous other forms of the interlock and its manner of application to different valve operating means can be readily devised.

Figure 1:
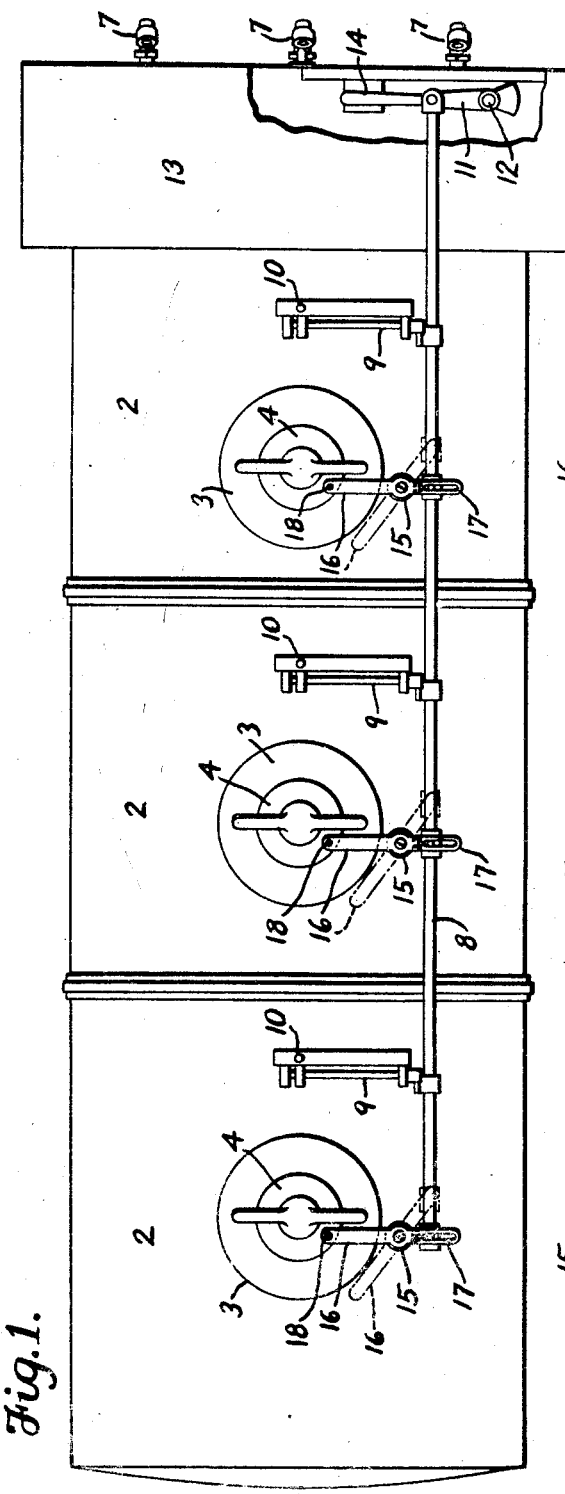
Figure 2:
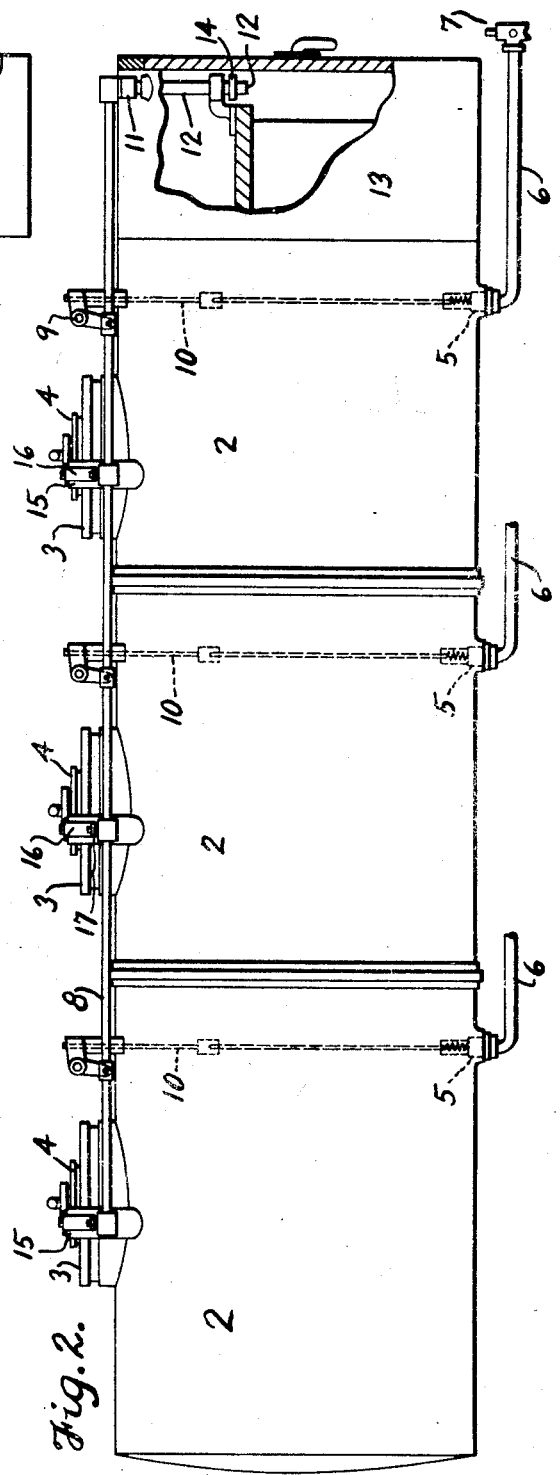
Fig. 2 is a side elevation, with a portion of the box broken away.

The tank shown in Figs. 1 and 2 has three separate compartments, each marked 2, but the tank may have any number of chambers. In the top of each compartment there is an opening provided with a cover. For purpose of illustration I have shown the type of cover which consists of a manhole cover 3 carrying a small cover 4 which closes a fill-opening in the manhole cover. The cover or covers may be of any form and may be fastened in any manner.

Each tank compartment has a bottom outlet which is normally closed by a spring-seated valve 5. From these outlets delivery pipes 6 extend to the rear end of the tank or to any other suitable point where they are provided with faucets or delivery valves 7.

The mechanical valve operating means shown in Figs. 1–3 is of a known kind which comprises a longitudinal control rod 8 extending along the top of the tank and connected at intervals to bell-crank rockers 9, which in turn are connected to the upper ends of pull connections 10 which extend upward from the several valves to pass through stuffing-boxes in the tops of the compartments. The rear end of the control rod is connected to a crank 11 on the upper end of a rock-shaft 12, which is shown passing through the top of a box 13. A hand lever 14 on this rock-shaft is pulled rearward to open the valves; the force thus exerted being applied to move the rod 8 rearward, and through the rockers 9 to raise the valves 5 from their seats. It may be understood that there is a catch for holding the lever and the connected mechanism in this condition, that is to say with the valves open, but as that is customary it has not been thought necessary to illustrate it.

In addition to these known matters the drawings show a simple form of the interlock between the valve mechanism and the covers which forms the particular novelty of this invention. On the top of each compartment a support 15 is provided, and on this support a bar 16 is pivoted intermediate its ends. One arm of each of these bars is fastened to the control rod 8 by a slotted connection 17 or the like, and the other arm of the bar is arranged so as to extend over the cover 3, 4 when the rod is in the position corresponding to the closed condition of the valves 5. In this position the bar positively obstructs the cover so that it can not be opened. The extremity of the bar may be provided with a screw 18 projecting downward into close proximity to the top of the cover 4, this screw being permanently fixed after having once been adjusted.

When, however, the rod 8 is moved rearward to open the valves, the bars 16 are swung clear of the covers, so that they can then be opened. One or both of the covers 3, 4 must be opened in order to permit the customer to inspect the level of the liquid within and to read or compare the indicator (not shown), and since the valve 5 has to be opened before opening the cover, any fraud or short measure resulting from the delivery pipe having been previously drained will be reflected by the liquid in the tank chamber being at too low a level. Likewise the interlock will naturally cause the employe to fill the tank with the emergency valves open.

Figs. 4 and 5 illustrate without unnecessary detail a hydraulic emergency valve apparatus. A cylinder 20, which may be located in the box 13, contains a piston (not shown), the rod 21 of which is operated by the short arm of a hand lever 22. When this lever is pulled to thrust forward on the rod 21 liquid is forced from the cylinder into a control pipe 23 having branches 24 to the several emergency valves 25, which are normally closed and are opened by pressure transmitted through the liquid which fills the cylinder 20, the piping 23, 24 and the expansible chambers (not shown) which actuate the valves. Again it has not been thought necessary to show a catch for holding the operating end of this hydraulic apparatus in actuated condition.

The pivot 26 of the hand lever 22 is a rock-shaft which is fixed to the lever and extends upward to the top of the tank, where it has a crank 27 connected to a longitudinally movable rod 28. This rod is guided in suitable bearings 29 and extends lengthwise over the series of compartments, after the manner of the rod 8 of Figs. 1–3. The bars 16 which lock or block the covers 3, 4 against being opened are like those already described, and are connected with the rod in a similar manner. When the lever 22 is operated to open the valves 25, these interlocks are affected as before so that the covers can be opened.

Numerous other embodiments of the invention will suggest themselves. The form of the interlocks and the particular manner in which they lock and unlock, or block and unblock, the covers can be varied widely.

I claim:

1. In a tank provided with an opening in its top, the combination with a cover for said opening and a valve controlling outflow of liquid from the tank, of apparatus for operating said valve, and an interlock between said valve apparatus and said cover preventing opening of the cover when the valve is closed and permitting the cover to be opened when the apparatus is operated to open the valve.

2. In a multiple compartment tank provided with openings in the tops of the several compartments, the combination with covers for said openings and valves controlling outflow of liquid from the several compartments, of an apparatus for operating said valves, and interlocks between said valve apparatus and the covers of the several compartments to prevent opening of said covers unless said valves are opened.

3. In a truck tank having an opening in its top, the combination with a cover for said opening, and a normally closed valve controlling outflow of liquid from the tank, of an operating mechanism having a part at the top of the tank and connections to said valve for opening the latter, and a device controlled by said part of the valve mechanism and associated with said cover to prevent opening of the latter when the valve mechanism is in the closed condition and to oblige the operator to open the valve in order that the cover may be opened.

4. In a truck tank having an opening in its top, a cover for said opening, a delivery conduit, and a valve normally shutting off flow of liquid from tank to conduit, of an operating handle, a part at the top of the tank operatively connected with said handle, connections operated by the handle for opening the valve, and a device associated with said part for preventing opening of said cover when said part is in a position corresponding with the closed condition of the valve and for permitting opening of the cover when said part is in a position corresponding to the opened condition of the valve.

5. In a truck tank which is divided into a number of separate compartments, each having an outlet valve, a delivery conduit extending from said valve, and a cover closing an opening in the top of the compartment, devices associated with the several covers to keep them from being opened, and control apparatus connected with the several valves and comprising a rod extending lengthwise of the series of compartments in operative relation to said devices, the relation being such that when said apparatus is operated to open said valves said devices are affected in a manner to permit the covers to be opened.

AUGUSTINE DAVIS, Jr.